(12) United States Patent
Camberg

(10) Patent No.: US 12,528,472 B2
(45) Date of Patent: Jan. 20, 2026

(54) IDENTIFYING THE DEGREE OF ATTENTIVENESS OF A VEHICLE OCCUPANT ON THE BASIS OF THE FREQUENCY DISTRIBUTION OF THE EYE OPENING WIDTH

(71) Applicant: Bayerische Motoren Werke Aktiengesellschaft, Munich (DE)

(72) Inventor: Simone Camberg, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 218 days.

(21) Appl. No.: 18/272,882

(22) PCT Filed: Jan. 11, 2022

(86) PCT No.: PCT/EP2022/050439
§ 371 (c)(1),
(2) Date: Jul. 18, 2023

(87) PCT Pub. No.: WO2022/157039
PCT Pub. Date: Jul. 28, 2022

(65) Prior Publication Data
US 2023/0406324 A1    Dec. 21, 2023

(30) Foreign Application Priority Data
Jan. 21, 2021 (DE) .................... 10 2021 101 208.2

(51) Int. Cl.
*B60W 40/08* (2012.01)
*G06V 20/59* (2022.01)
(Continued)

(52) U.S. Cl.
CPC ........... *B60W 40/08* (2013.01); *G06V 20/597* (2022.01); *G06V 40/16* (2022.01); *G06V 40/18* (2022.01);
(Continued)

(58) Field of Classification Search
CPC ........... B60W 40/08; B60W 2420/403; B60W 2540/225; B60W 2540/229; G06V 20/597;
(Continued)

(56) References Cited

U.S. PATENT DOCUMENTS

| 5,786,765 A | 7/1998 | Kumakura et al. |
| 9,662,977 B2 | 5/2017 | Kapuria et al. |

(Continued)

FOREIGN PATENT DOCUMENTS

| CN | 1830389 A | 9/2006 |
| CN | 106372621 A | 2/2017 |

(Continued)

OTHER PUBLICATIONS

International Search Report (PCT/ISA/210) issued in PCT Application No. PCT/EP2022/050439 dated Apr. 28, 2022 with English translation (6 pages).

(Continued)

*Primary Examiner* — Andrew R Dyer
(74) *Attorney, Agent, or Firm* — Crowell & Moring LLP

(57) ABSTRACT

A method for operating a driver assistance system includes triggering an assistance measure according to a current degree of attentiveness of a vehicle occupant while a motor vehicle is traveling. The current degree of attentiveness is identified in that, during travel and within an observation interval, a current eye opening width of at least one eye of the vehicle occupant is recorded several times as the distance between an upper and a lower eye measurement point, and a frequency distribution of the various eye opening widths is calculated for the at least one observation interval. Comparative frequency distributions are provided, with a known degree of attentiveness being assigned to each comparative frequency distribution. On the basis of a compari- (Continued)

son, it is determined which of the comparative frequency distributions is closest to the frequency distribution observed.

11 Claims, 6 Drawing Sheets

(51) Int. Cl.
  *G06V 40/16* (2022.01)
  *G06V 40/18* (2022.01)
(52) U.S. Cl.
  CPC . *B60W 2420/403* (2013.01); *B60W 2540/225* (2020.02); *B60W 2540/229* (2020.02)
(58) Field of Classification Search
  CPC ...... G06V 40/16; G06V 40/18; G06V 40/193; A61B 5/1103; A61B 5/163; A61B 5/18; G08B 21/06
  USPC .......................................................... 701/1
  See application file for complete search history.

(56) References Cited

U.S. PATENT DOCUMENTS

| | | | |
|---|---|---|---|
| 10,482,333 | B1 | 11/2019 | el Kaliouby et al. |
| 10,617,295 | B2* | 4/2020 | Klin ................. A61B 3/113 |
| 10,875,536 | B2* | 12/2020 | Fung ................. B62D 6/007 |
| 11,718,328 | B2* | 8/2023 | Bieg ................. B60W 50/16 |
| | | | 701/23 |
| 2009/0027212 | A1 | 1/2009 | Nakagoshi et al. |
| 2011/0205350 | A1* | 8/2011 | Terashima ............ G08B 21/06 |
| | | | 348/78 |
| 2011/0243376 | A1* | 10/2011 | Luke .................. G06V 10/507 |
| | | | 382/103 |
| 2012/0179008 | A1 | 7/2012 | Burton |
| 2016/0104050 | A1* | 4/2016 | Bogner ................. B60T 7/12 |
| | | | 701/1 |
| 2019/0102638 | A1* | 4/2019 | Nanu ..................... G06T 7/50 |
| 2020/0216095 | A1* | 7/2020 | Isozaki ................. A61M 21/00 |
| 2020/0265251 | A1 | 8/2020 | Vandommele et al. |
| 2020/0290628 | A1* | 9/2020 | Pinoteau .............. B60W 40/04 |
| 2020/0390379 | A1* | 12/2020 | Tsujikawa ............ A61B 5/1103 |
| 2021/0129851 | A1* | 5/2021 | Wieczorek ........... G06V 40/161 |
| 2021/0402993 | A1* | 12/2021 | Zhao ..................... B60K 35/28 |
| 2022/0000394 | A1* | 1/2022 | Sakata .................... A61B 5/18 |

FOREIGN PATENT DOCUMENTS

| | | |
|---|---|---|
| DE | 197 15 519 A1 | 11/1997 |
| DE | 10 2008 040 709 A1 | 2/2009 |
| DE | 10 2011 011 221 A1 | 7/2012 |
| DE | 10 2015 225 109 A1 | 6/2017 |
| DE | 199 83 911 B4 | 9/2018 |
| DE | 10 2017 216 328 B3 | 12/2018 |
| EP | 2 330 582 A1 | 6/2011 |
| JP | 2019-154613 A | 9/2019 |

OTHER PUBLICATIONS

German-language Written Opinion (PCT/ISA/237) issued in PCT Application No. PCT/EP2022/050439 dated Apr. 28, 2022 (7 pages).
German-language Search Report issued in German Application No. 10 2021 101 208.2 dated Jun. 2, 2021 with partial English translation (12 pages).
Dari, S. et al., "Unsupervised Blink Detection and Driver Drowsiness Metrics on Naturalistic Driving Data", 2020 IEEE $23^{rd}$ International Conference on Intelligent Transportation Systems (ITSC), Sep. 20, 2020, pp. 1-6, XP055912633 (6 pages).
Chinese-language Office Action issued in Chinese Application No. 202280009542.8 dated Jul. 18, 2025 with partial English translation (28 pages).

* cited by examiner

IDENTIFYING THE DEGREE OF ATTENTIVENESS OF A VEHICLE OCCUPANT ON THE BASIS OF THE FREQUENCY DISTRIBUTION OF THE EYE OPENING WIDTH

BACKGROUND AND SUMMARY OF THE INVENTION

The invention relates to a method for operating a driver assistance system for a motor vehicle, wherein in the course of a journey of the motor vehicle, an assistance measure is triggered depending on a current degree of attentiveness of the vehicle occupant. The invention additionally relates to such a driver assistance system and a motor vehicle having such a driver assistance system.

It is known that fatigue and/or a lack of attentiveness of a vehicle occupant, in particular a vehicle driver, can result in critical traffic situations in road traffic. Since fatigue can set in gradually or a degree of attentiveness can decrease gradually, it is often not readily identifiable for the vehicle driver himself when he should take a break. Efforts have therefore been taken to develop driver assistance systems which can assist the motor vehicle driver in such a situation, in that they make him aware of his lack of attentiveness by assistance measures.

Known driver assistance systems of the above-described type are often based on facial recognition methods. For this purpose, the face of the vehicle driver is filmed with the aid of a camera or acquired in another manner, so that it can be analyzed by known facial recognition algorithms. Such a facial recognition is a very computing-intensive process.

A monitoring system for monitoring a status of a motor vehicle driver is known from U.S. Pat. No. 9,662,977 B2. Facial recognition algorithms are also used here, wherein a head position of the motor vehicle driver is evaluated as to whether it suggests that the motor vehicle driver is focused on driving the motor vehicle or it describes a fatigue of the motor vehicle driver. It is also checked in the context of the facial recognition whether the eyes of the motor vehicle driver are open or closed.

The analysis of a mental status of a motor vehicle driver according to U.S. Pat. No. 10,482,333 B1 is based on a similar observation. A face of the vehicle driver is also acquired here by a camera and it is identified by known facial recognition algorithms whether the eyes of the vehicle driver are closed. The analysis is then based on a detected blinking rate of the vehicle driver. Blinking means here that the eyes of the vehicle driver are identified as completely closed.

Neglecting the fact that the described facial recognition methods represent very computing-intensive operations, blink detection is very susceptible to error. Thus, for example, a downwardly directed look of a vehicle driver can already incorrectly be identified as a blink. People having very small eyes are often also incorrectly identified as blinking. A reliability of an analysis of a state of attentiveness of the vehicle driver can be negatively affected in this way. Individual facial features of a new motor vehicle driver unknown to such a facial recognition system also often cannot be correctly identified. As a result, the facial recognition system has to be complexly retrained for each motor vehicle driver.

It is the object of the present invention to notify a motor vehicle driver reliably of his decreasing level of attention.

The object is achieved by the claimed invention.

The invention is based on the finding that valuable items of information with respect to a state of attentiveness of a motor vehicle driver can be obtained even without complex facial recognition algorithms. In particular, it has been recognized that informative conclusions about the state of attentiveness can be drawn from a frequency distribution of various eye opening widths, without being dependent on reliable accounting of individual blinks.

A method for operating a driver assistance system for a motor vehicle is provided by the invention. In the course of a journey of the motor vehicle, an assistance measure is triggered for this purpose in dependence on a current degree of attentiveness of a vehicle occupant, in particular a vehicle driver. The assistance measure can consist, for example, of a visual and/or an acoustic notification to the vehicle occupant.

To determine the current degree of attentiveness, initially a facial recognition is carried out which comprises at least one upper and at least one lower eye measuring point being assigned to at least one eye of the vehicle occupant. In other words, in a fundamentally known manner, a face of the vehicle occupant can be filmed or recorded by a camera, wherein the face is provided with characteristic points, so-called facial landmarks. These facial landmarks comprise so-called eye landmarks or characteristic eye measuring points. According to embodiments of the invention, at least one upper and at least one lower eye measuring point is thus assigned to at least one eye of the vehicle occupant. According to the known methods of facial recognition, a comparison of the distribution of the landmarks to known facial models would now take place in a computing-intensive manner. In contrast thereto, according to embodiments of the invention only an eye opening width is acquired, as described hereinafter.

According to embodiments of the invention, a respective current eye opening width of the at least one eye of the vehicle occupant is acquired multiple times during the journey in the course of at least one observation interval. The eye opening width is acquired or calculated as the distance between the at least one upper and the at least one lower eye measuring point. The distance can be a vertical distance between the eye measuring points. In contrast to known methods, it is possible to dispense with acquiring a horizontal distance of the eye measuring points. This advantageously prevents a corruption of the acquisition of the eye opening width when the driver does not look essentially directly into the camera.

In the course of at least one observation interval, a large number of different eye opening widths can be acquired in this manner. The observation interval can be, for example, four minutes long, wherein 15 image frames or frames can be recorded each second. The respective current eye opening width per frame is advantageously acquired. In this example, 3600 current eye opening widths would thus accumulate within the observation interval. The observation interval can also be shortened or lengthened, of course. This can be selected according to specific requirements, as described in more detail hereinafter.

According to embodiments of the invention, a frequency distribution of the different eye opening widths is now calculated for the at least one observation interval. In other words, it is thus calculated how often and/or over which duration a respective eye opening width was acquired within the at least one observation interval.

In addition, comparison frequency distributions are provided, wherein a known degree of attentiveness is assigned in each case to a respective comparison frequency distribution. The comparison frequency distributions can comprise, for example, historic frequency distributions for eye opening widths, which can have been recorded, for example, for the current vehicle driver and/or for other vehicle drivers.

A comparison or matching of the calculated frequency distribution and the comparison frequency distributions then takes place according to embodiments of the invention. In the context of this matching, from the comparison frequency distributions, the one is determined which has a predetermined degree of correspondence with the calculated frequency distribution in at least one criterion. If the calculated frequency distribution and the comparison frequency distributions are graphically represented, such a criterion can thus consist, for example, of a shape and/or regularity and/or height and/or width of the graphically represented distributions. In principle, the comparison or matching described here is based on statistical methods fundamentally known to a person skilled in the art.

According to embodiments of the invention, the current degree of attentiveness of the vehicle occupant is identified as the degree of attentiveness assigned to the comparison frequency distribution determined in this way. If the current degree of attentiveness does not meet predetermined requirements because it is obvious that the vehicle driver is tired, for example, the assistance measure can be triggered.

The advantage results due to embodiments of the invention in which complex facial recognition and processing algorithms are not required in order, for example, to identify a blinking rate or a direction of view of the vehicle occupant. The value of the acquired eye opening width can be used directly. It does not have to be scaled in a further method step. This also advantageously saves computing capacity. In addition, the method according to embodiments of the invention has an increased level of reliability in comparison to the known method. This results, inter alia, because according to embodiments of the invention the solely binary state eyes open/eyes closed does not necessarily have to be able to be reliably identified. The above-mentioned susceptibility to error of the known systems with respect to looking downward and/or with respect to persons having small eyes therefore come into consideration less in the method according to embodiments of the invention than in the known method.

The invention includes various embodiments, due to which additional advantages result.

One embodiment provides that the different eye opening widths can assume arbitrary values between an open eye status and a closed eye status. In other words, the method is not restricted to identifying closed eyes. Incorrectly detected blinking is of no consequence or less consequence in this way, as already mentioned. If a driver has an elevated level of fatigue, it can thus occur that his eyes overall have a smaller opening width than in the alert state. However, this does not necessarily have to be accompanied by an elevated blinking rate. An identification method supported solely on the blinking rate could therefore not reliably identify the fatigue, in contrast to the method described here. In contrast, in the frequency distribution of the eye opening widths, continuously slightly open eyes are reflected in a characteristic form of the frequency distribution.

One embodiment provides that a chronological duration of the at least one observation interval is selected as a function of a duration of the journey of the motor vehicle. In other words, the observation interval can be adapted to a journey duration. Alternatively or additionally, the observation intervals can be adapted to different driving situations in the course of the driving duration. Thus, for example, shorter observation intervals can be selected in the course of a high level of activity during the journey. A high level of activity can be expected, for example, in dense city traffic. On the other hand, the observation intervals can be selected to be longer if little activity is to be expected from the driver. This can be the case, for example, during a longer freeway journey. In this way, a journey can be represented particularly realistically by the observation intervals.

Alternatively or additionally, an "alert" observation interval can be recorded for the driver at the beginning of a journey. This "alert" comparison frequency distribution of the eye opening widths can be used as the basis for the comparison to the frequency distributions recorded or calculated in the following course of the journey. This can be repeated after a pause. In this way, a respective current comparison frequency distribution for the described detection method is always advantageously available.

The course of the journey of the motor vehicle can thus comprise a plurality of observation intervals. The observation intervals can follow one another directly over time, however, they can also be spaced apart from one another over time by pauses. The driver of the motor vehicle can preferably actively start the described method when he has the feeling that his attentiveness is decreasing.

Alternatively or additionally, weighting of the individual observation intervals can take place in the determination of the degree of attentiveness. The observation intervals or the frequency distributions acquired in the course of the observation intervals can thus be weighted differently in dependence on their chronological sequence.

One advantageous refinement provides that the observation intervals are weighted differently in dependence on the point in time of their application with respect to a beginning of the journey. Thus, for example, an observation interval after several hours of journey duration can be weighted higher than an observation interval at the beginning of the journey. The sensitivity of the method is advantageously increased in generally more critical driving situations in this way.

One embodiment provides that the frequency distribution and/or the comparison frequency distributions are calculated as histograms. The advantage results in this way that the shape of the histograms can be compared to one another easily. In the case of a driver having an average level of attentiveness, a left-skewed distribution can be observed. In other words, in the case of a driver having an average level of attentiveness, many wide-open eyes and only a few closed eyes can be observed. This is apparent at first glance in such a histogram and can therefore also be recognized by image processing programs without great computing effort.

The frequency distribution and/or the comparison frequency distributions can preferably also be calculated as core density estimations. A continuous depiction of the acquired eye opening widths over the respective observation interval results in this way. Outliers or incorrect measurements are of less consequence than in the histogram representation.

The invention additionally relates to a driver assistance system for a motor vehicle, which is designed to determine a current degree of attentiveness of a vehicle occupant in the course of a journey of the motor vehicle and to trigger an assistance measure depending on the current degree of attentiveness. The driver assistance system can comprise, for example, one or more camera sensors, by way of which the face of the vehicle occupant, in particular the motor vehicle driver, can be acquired. The driver assistance system can also comprise a central computing unit, in which algorithms can be executed, which assign at least one upper and at least one lower eye measuring point to the at least one eye of the vehicle occupant. The calculation of the respective current eye opening widths and/or the calculation of the frequency distribution of the different eye opening widths can also be calculated in the computing unit of the driver assistance system.

The driver assistance system can include a database having comparison frequency distributions. Alternatively or additionally, it can be provided that the driver assistance system can access a central server unit, wherein in this case the comparison frequency distribution can be provided by the central server unit.

It can be determined in the central computing unit of the driver assistance system, in particular by a comparison module, as described above which of the comparison frequency distributions has a predetermined degree of correspondence with the calculated frequency distribution in the at least one criterion.

The driver assistance system is additionally designed to trigger the mentioned assistance measure. A visual and/or acoustic notification to the driver of the motor vehicle can be generated as the assistance measure, as described above. Depending on the degree of vehicle autonomy (fully autonomous, semiautonomous), the assistance measure can also consist of an intervention, for example, in a steering system of the motor vehicle and/or in an engine controller of the motor vehicle.

The invention additionally relates to a motor vehicle having such a driver assistance system.

The invention also includes refinements of the driver assistance system according to embodiments of the invention and/or the motor vehicle according to embodiments of the invention which have features as have already been described in conjunction with the refinements of the method according to embodiments of the invention and vice versa. For this reason, the corresponding refinements of the driver assistance system according to embodiments of the invention and/or the motor vehicle according to embodiments of the invention are not described once again here.

The invention also comprises the combinations of the features of the described embodiments. Further features of the invention can result from the following description of the figures and on the basis of the drawings. The features and combinations of features mentioned above in the description and the features and combinations of features shown hereinafter in the description of the figures and/or solely in the figures are usable not only in the respective specified combination, but also in other combinations or alone without departing from the scope of the invention.

DETAILED DESCRIPTION OF THE DRAWINGS

In the figures, identical and functionally-identical elements are provided with identical reference signs.

Figure 1:
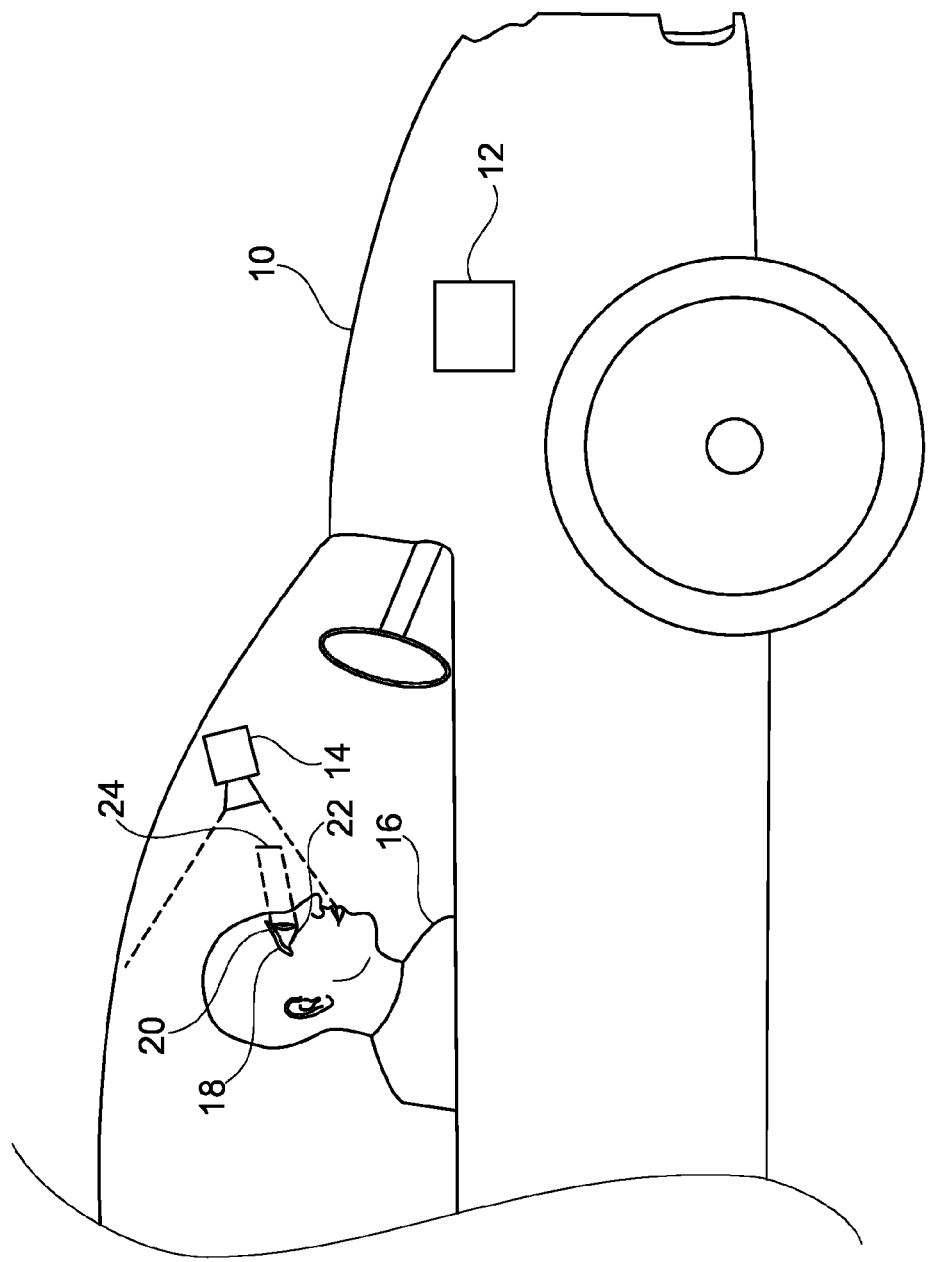
FIG. 1 shows a schematic representation of a motor vehicle occupant in a motor vehicle having a driver assistance system.

FIG. 1 shows a motor vehicle 10 having a driver assistance system 12. The reader should refer to the following description of the figures, in particular FIG. 2, for a more detailed description of the driver assistance system 12. Only a camera system 14 of the driver assistance system 12 is shown in FIG. 1, by way of which a face of a vehicle occupant 16 can be filmed. The face of the vehicle occupant 16 filmed in this way can be used as the basis of a facial recognition, wherein the facial recognition comprises at least one upper and at least one lower eye measuring point 20, 22 being assigned to at least one eye 18 of the vehicle occupant 16. The distance between the eye measuring points 20, 22 can describe a respective current eye opening width 24 of the vehicle occupant 16. The eye opening width 24 can assume an arbitrary value between a completely closed and an open eye.

Figure 2:
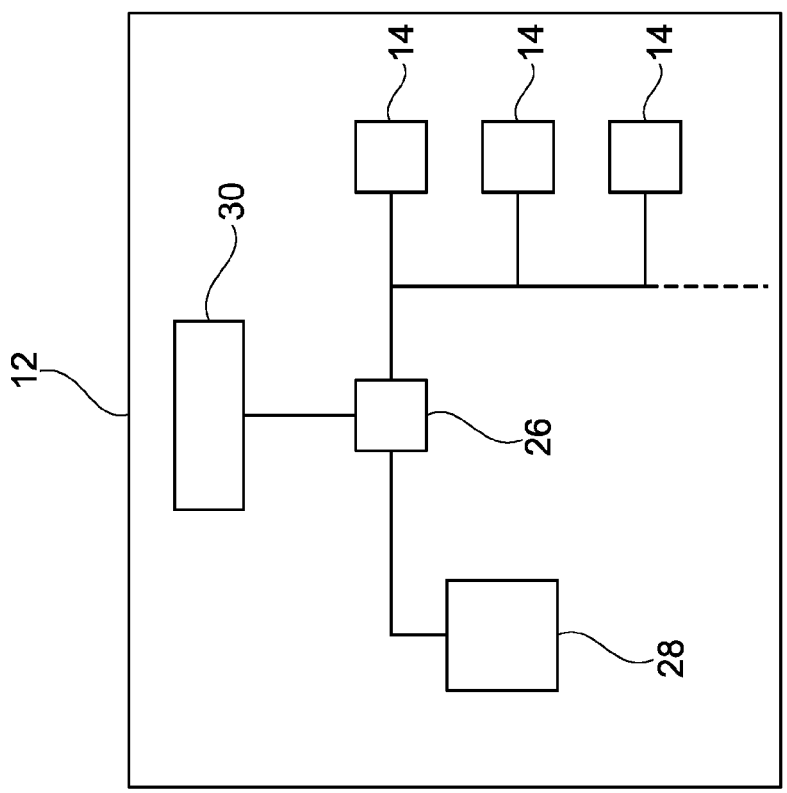
FIG. 2 shows a schematic representation of a driver assistance system.

With reference to the designations and descriptions made in conjunction with FIG. 1, FIG. 2 shows a schematic representation of a driver assistance system 12. The driver assistance system 12 can comprise various sensors 14. In addition to the above-described camera sensors 14, these can be further sensors which detect a condition of the vehicle occupant 16. These can include, for example, sensors which detect a blood pressure and/or a heart rate and/or a skin resistance of the vehicle occupant. There can be a data connection between these sensors 14 and a central computing unit 26 of the driver assistance system 12. The computing unit 26 can be connected to a database unit 28 via a further data connection. Comparison frequency distributions of known eye opening widths 24 can be stored in the database unit 28. Alternatively or additionally, there can be a communication connection (not shown here) between the computing unit 26 and a central server unit, wherein in this case comparison frequency distributions can be provided by the server unit for the driver assistance system 12.

A calculation of a frequency distribution of the different eye opening widths 24 for a respective observation interval can be calculated in the central computing unit 26. Moreover, a comparison between the calculated frequency distribution and the comparison frequency distributions can take place in the central computing unit 26. The output of an assistance measure 30 can be triggered as a result of the comparison by the computing unit 26. As described above, the assistance measure 30 can consist of a visual and/or acoustic notification to the vehicle occupant 16. For the case of an autonomous or at least semiautonomous motor vehicle 10, the assistance measure 30 can also be that an intervention is triggered in an engine controller and/or in a steering controller of the motor vehicle 10.

Figure 3:
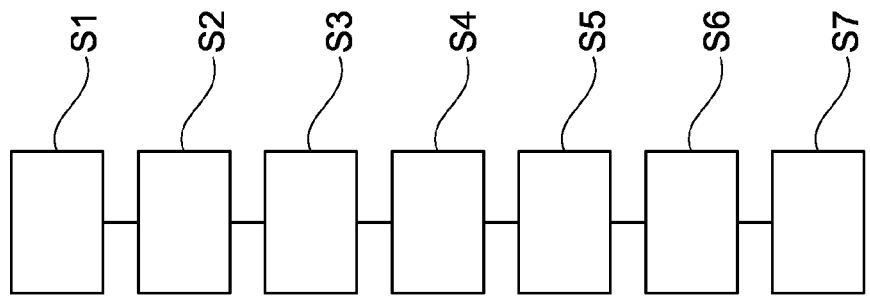
FIG. 3 shows a schematic representation of a method for operating a driver assistance system.

With reference to the components designated and described in conjunction with FIGS. 1 and 2, FIG. 3 shows a schematic representation of a method for operating a driver assistance system 12. In a step S1, a facial recognition of a face of a vehicle occupant 16 is carried out, wherein the facial recognition comprises that at least one upper and at least one lower eye measuring point 20, 22 are assigned to at least one eye 18 of the vehicle occupant 16. The upper eye measuring point 20 can be the uppermost eye measuring point of the eye 18 and the lower eye measuring point 22 can be the lowermost eye measuring point of the eye 18. During a journey of the motor vehicle 10, a respective current eye opening width 24 of the at least one eye 18 of the vehicle occupant 16 is acquired multiple times in the course of at least one observation interval as the distance between the at least one upper and the at least one lower eye measuring point 20, 22 (step S2). In a step S3, a frequency distribution of the different eye opening widths 24 is calculated for the at least one observation interval. In a preceding and/or parallel and/or following step S4, comparison frequency distributions are provided, wherein a known degree of attentiveness is assigned to a respective comparison frequency distribution. In a step S5, the one is determined from the comparison frequency distributions which has a predetermined degree of correspondence and at least one criterion to the calculated frequency distribution. In a step S6, the current degree of attentiveness is recognized as the degree of attentiveness assigned to the comparison frequency distribution determined in this way. In a step S7, an assistance measure 30 is finally triggered in dependence on the recognized current degree of attentiveness of the vehicle occupant 16.

Figure 4:
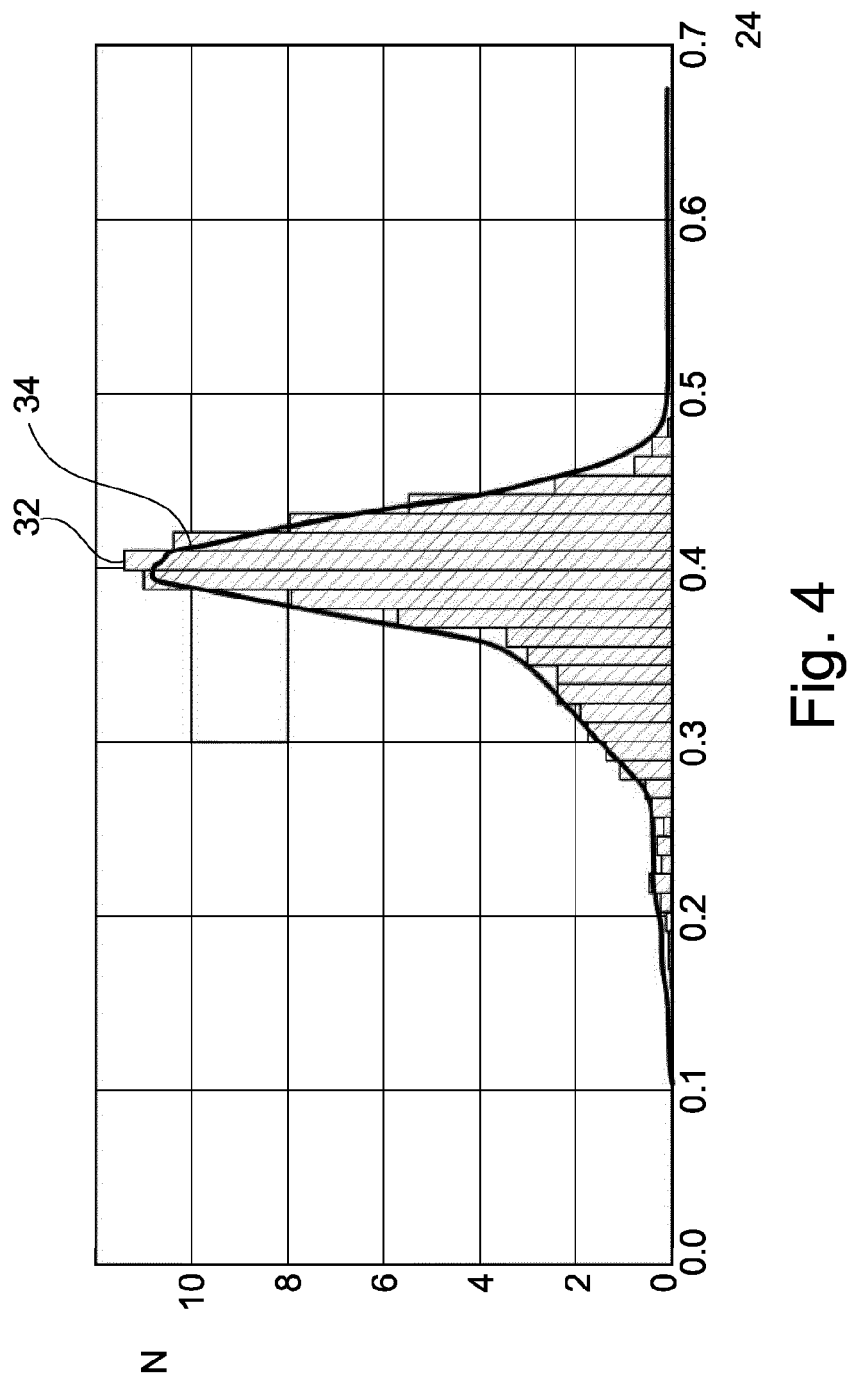
FIG. 4 shows an exemplary illustration of a first frequency distribution.
Figure 5:
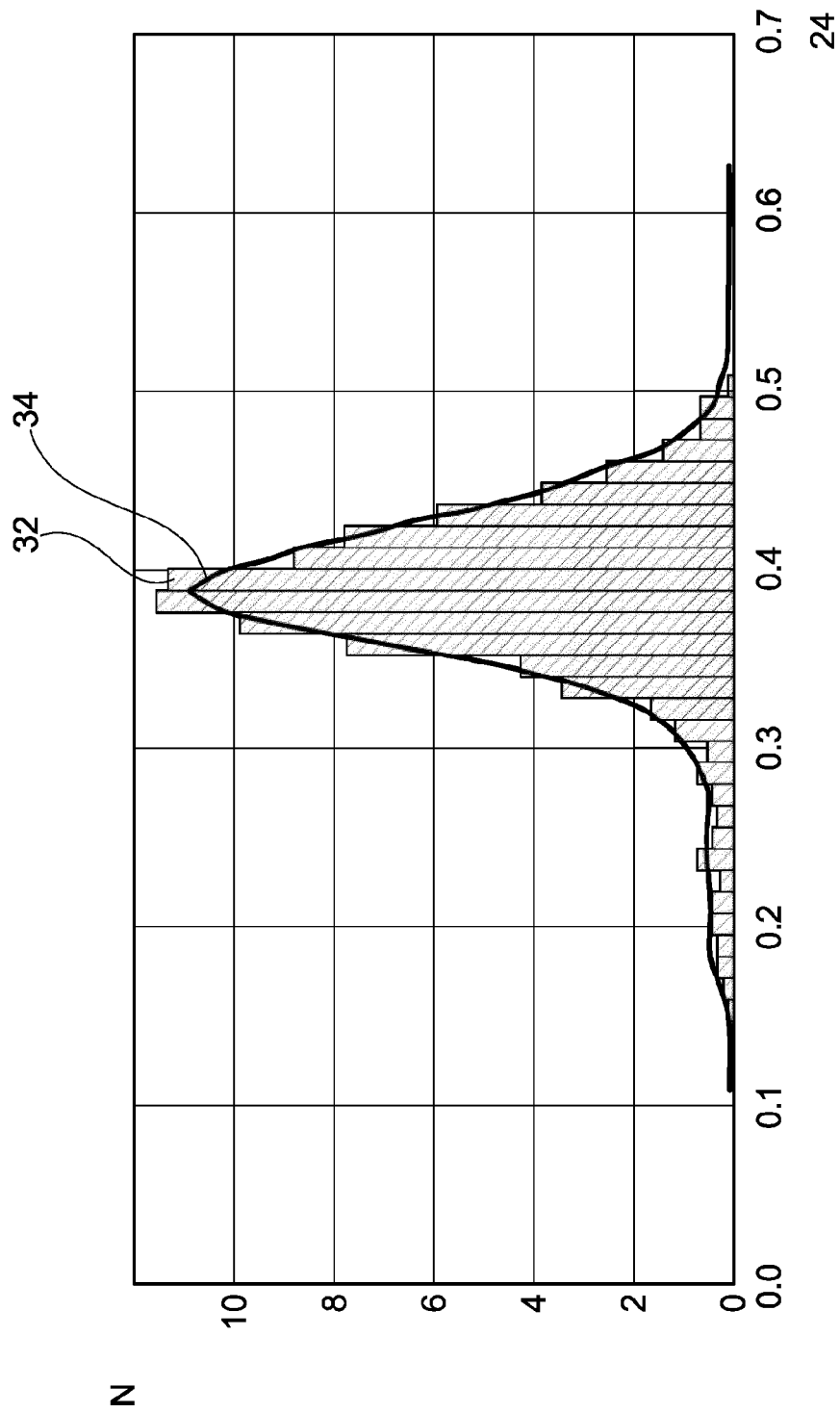
FIG. 5 shows a schematic representation of a further frequency distribution.
Figure 6:
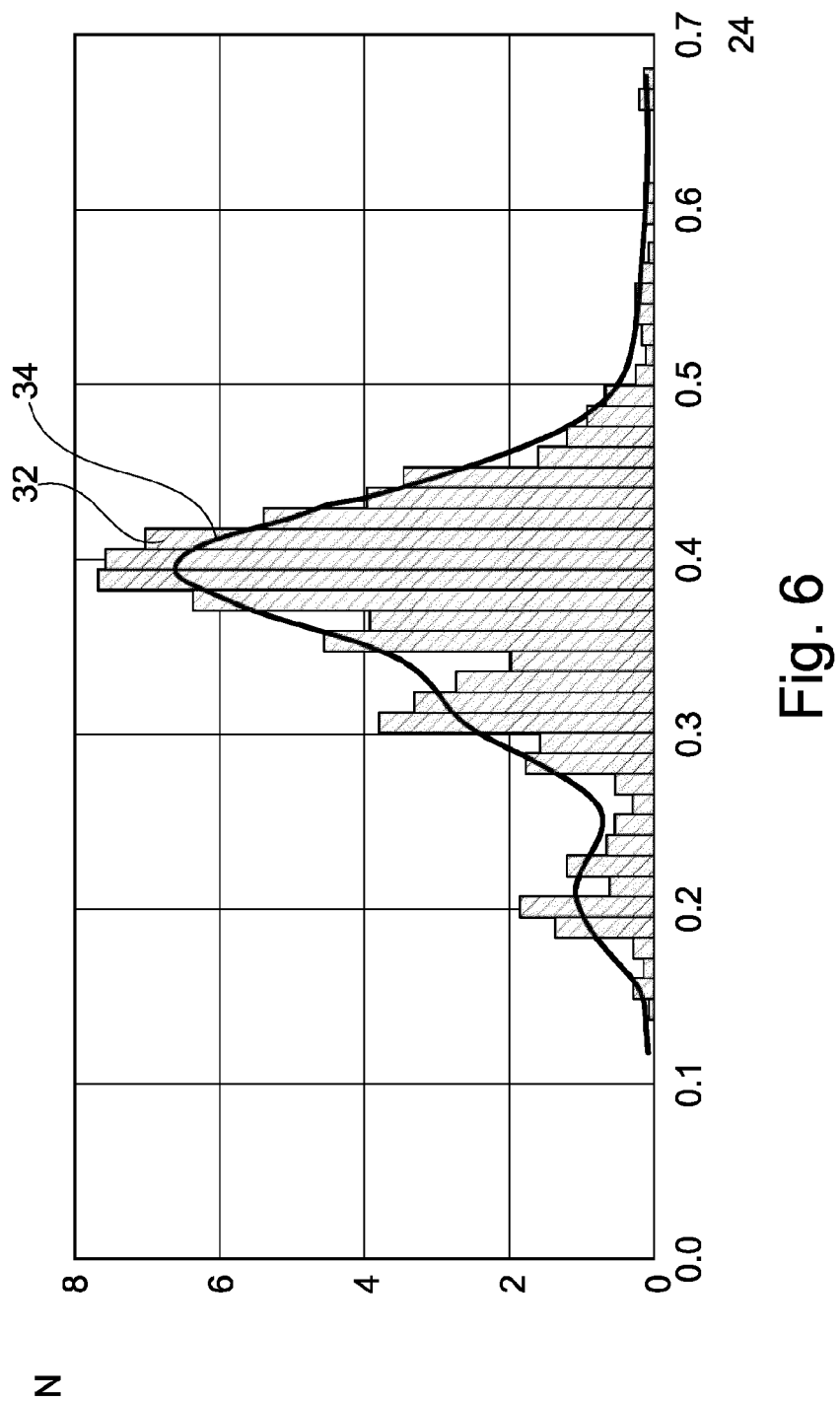
FIG. 6 shows a schematic representation of a further frequency distribution.
Figure 7:
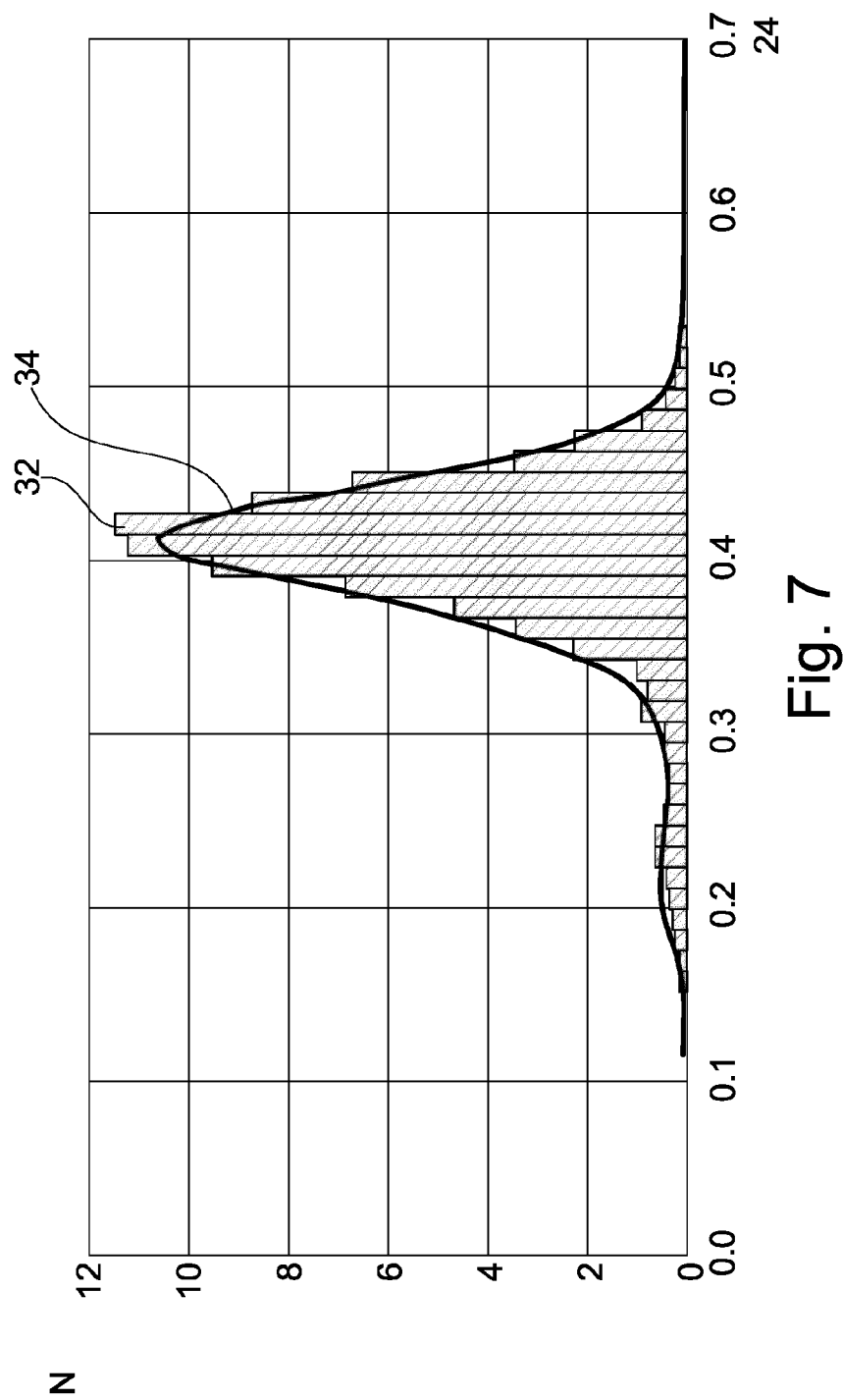
FIG. 7 shows a schematic representation of a further frequency distribution.

FIGS. 4 to 7 each show schematic representations of exemplary frequency distributions. An eye opening width 24 is plotted in each case here on the X axis. The number N for the respective eye opening widths 24 is plotted on the Y axis. The frequency distributions are represented as histograms 32 and as core density estimations 34. The individual frequency distributions display characteristic shapes. The frequency distributions of FIGS. 5 and 7 are thus to be assigned to an "alert" vehicle occupant 16. This is apparent in that few small and/or entirely closed eyes and many at least partially or entirely open eyes are depicted.

In contrast, the frequency distribution of FIG. 4 displays a strengthened transition toward increasingly less open eyes.

Finally, a very irregular frequency distribution is shown in FIG. 6, from which a reduced degree of attentiveness of the vehicle occupant 16 may be concluded.

The frequency distributions shown in FIGS. 4 to 7 already reliably provide a conclusion about a respective degree of attentiveness of a vehicle occupant 16 on the basis of the qualitative shape. Complex running through a facial recognition program can advantageously be avoided in this way.

Overall, the examples show how frequency distributions of eye opening widths can be used for vehicle occupant monitoring by embodiments of the invention.

LIST OF REFERENCE SIGNS 10 motor vehicle
12 driver assistance system
14 sensor
16 vehicle occupant
18 eye
20 upper eye measuring point
22 lower eye measuring point
24 eye opening width
26 computing unit
28 database unit
30 assistance measure
32 histogram
34 core density estimation

The invention claimed is:

1. A method for operating a driver assistance system for a motor vehicle, the method comprising:

triggering an assistance measure in dependence on a current degree of attentiveness of a vehicle occupant, wherein the current degree of attentiveness is determined by:

performing a facial recognition of a face of the vehicle occupant, wherein the facial recognition comprises that at least one upper eye measuring point and at least one lower eye measuring point are assigned to at least one eye of the vehicle occupant, acquiring a respective current eye opening width of the at least one eye of the vehicle occupant multiple times in a course of at least one observation interval as a distance between the at least one upper eye measuring point and the at least one lower eye measuring point, calculating a frequency distribution of the different eye opening widths for the at least one observation interval, providing a plurality of comparison frequency distributions of known eye opening widths, wherein a known degree of attentiveness is assigned in each case to a respective comparison frequency distribution, from the plurality of comparison frequency distributions, determining one comparison frequency distribution which has a predetermined degree of correspondence in at least one criterion with the calculated frequency distribution by comparing the calculated frequency distribution with the plurality of comparison frequency distributions, and identifying the current degree of attentiveness as the degree of attentiveness assigned to the determined comparison frequency distribution.

2. The method according to claim 1, wherein the different eye opening widths assume arbitrary values between an open eye state and a closed eye state.

3. The method according to claim 1, wherein a chronological duration of the at least one observation interval is selected as a function of a duration of a journey of the motor vehicle.

4. The method according to claim 1, wherein a course of a journey of the motor vehicle comprises a plurality of observation intervals.

5. The method according to claim 4, wherein the observation intervals follow one another in direct chronological sequence, and the observation intervals are weighted differently in dependence on the chronological sequence.

6. The method according to claim 4, wherein the observation intervals are weighted differently in dependence on a point in time of application with respect to a beginning of the journey.

7. The method according to claim 1, wherein at least one of the calculated frequency distribution or the comparison frequency distributions are calculated as histograms.

8. The method according to claim 1, wherein at least one of the calculated frequency distribution or the comparison frequency distributions are calculated as core density estimations.

9. The method according to claim 1, wherein the at least one criterion comprises at least one of a shape, a regularity, a height, or a width of the frequency distributions.

10. A driver assistance system for a motor vehicle, the driver assistance system comprising a camera, wherein the driver assistance system is configured to determine a current degree of attentiveness of a vehicle occupant and to trigger an assistance measure in dependence on the current degree of attentiveness, wherein the current degree of attentiveness is determined by:

performing a facial recognition of a face of the vehicle occupant, wherein the facial recognition comprises that at least one upper eye measuring point and at least one lower eye measuring point are assigned to at least one eye of the vehicle occupant, acquiring a respective current eye opening width of the at least one eye of the vehicle occupant multiple times in a course of at least one observation interval as a distance between the at least one upper eye measuring point and the at least one lower eye measuring point, calculating a frequency distribution of the different eye opening widths for the at least one observation interval, providing a plurality of comparison frequency distributions of known eye opening widths, wherein a known degree of attentiveness is assigned in each case to a respective comparison frequency distribution, from the plurality of comparison frequency distributions, determining one comparison frequency distribution which has a predetermined degree of correspondence in at least one criterion with the calculated frequency distribution by comparing the calculated frequency distribution with the plurality of comparison frequency distributions, and identifying the current degree of attentiveness as the degree of attentiveness assigned to the determined comparison frequency distribution.

11. A motor vehicle comprising the driver assistance system according to claim 10.

* * * * *